E. M. BIRDSALL.
Thrashing Machine.
No. 37,895.
Patented March 17, 1863.
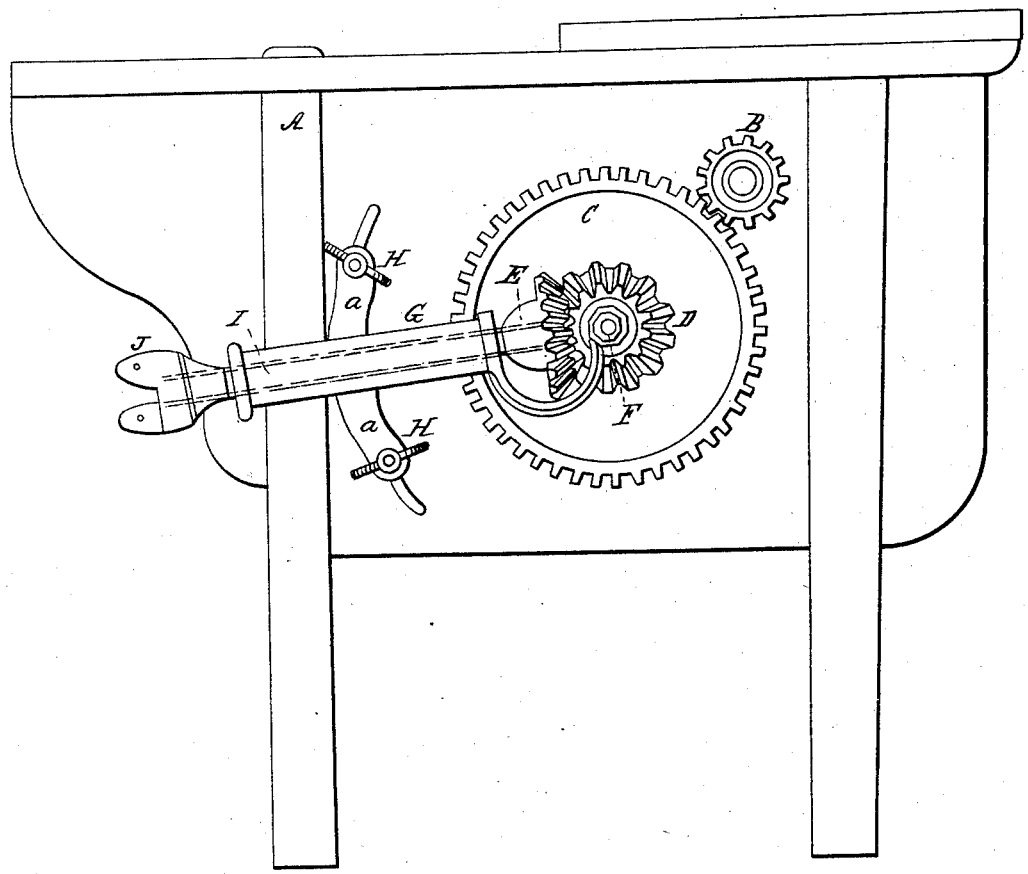
Witnesses:
Wm Comstock
Charles Ketchum
Inventor:
Edgar M. Birdsall

UNITED STATES PATENT OFFICE.

EDGAR M. BIRDSALL, OF PENN YAN, NEW YORK.

IMPROVEMENT IN THRASHING-MACHINES.

Specification forming part of Letters Patent No. 37,895, dated March 17, 1863.

*To all whom it may concern:*

Be it known that I, EDGAR M. BIRDSALL, of Penn Yan, in the county of Yates and State of New York, have invented a new and useful Improvement in Thrashing-Machines; and I do hereby declare that the following is a full, clear, and exact description of the construction and operation of the same, reference being had to the annexed drawing, making a part of this specification, in which the figure is a side elevation of the machine, showing all the parts of my invention.

A is the frame of the machine. It is constructed in any ordinary manner. It is usually made to be connected with a separating attachment in such manner that they may be easily carried on a wagon.

B is a pinion fastened on the axle of the cylinder. By it motion is given to the thrashing-cylinder. With my invention any kind of cylinder may be used.

C is a spur-wheel rotating on the axle F and driving the pinion B.

D is a miter-wheel. It is securely fastened to the wheel C and rotates upon the same axle F, and by it the wheel C is driven. Bevel-gear may be used if desired.

E is a miter-wheel. Its use is to drive the wheel D. It is securely fastened to the end of the shaft or axle I, that passes through the sleeve of the adjustable support G.

F is a stationary axle. Its use is to hold the wheels C and D, and one end of the sleeve or support G. There is nothing peculiar in its construction.

G is an adjustable support used to hold the wheel E and axle I. It is made in shape as represented in the figure. The end toward the center of the machine is provided with a hollow bearing, which must be fitted to the axle F so as to turn freely. It may be held upon the axle by a pin, key, or nut. From this part it is made curved for the purpose of receiving the wheel E within the curve, so that the center of the wheel will be in line with the center of the support or sleeve G. From this curve toward the rear end of the machine it is made straight, round, and hollow to receive the shaft or axle I. This round part is provided with arms *a a*, by which it is held in position. There are holes through these arms for the insertion of bolts to hold it in place.

H and H are bolts that pass through the arms *a* and *a* and through circular slots in the side of the machine. These slots are made in the arc of a circle of which the center is at the center of the axle F. They are made long enough to allow sufficient movement of the support or sleeve G. By means of the arms, bolts, and slots the support G may be adjusted as required.

I is a shaft or axle that connects the wheel E and the clutch J. It passes through the sleeve of the support G, in which it rotates. Its position is shown by dotted lines.

J is a clutch or coupling of any ordinary construction secured to the rear end of the axle I to connect the machine with the power that drives it.

To use my invention. when the power and machine are placed in position, loosen the bolts H and H; then place the support G in line by raising or lowering, and when in line from the center of the axle F and the power make it fast by the bolts H and H. The use of my invention is to keep the line of power straight when the machine is set higher or lower than the power, thereby avoiding much friction, and thus saving much power.

What I claim as my invention, and desire to secure by Letters Patent, is—

1. The support G when made and used as and for the purpose specified.

2. The wheels C, D, and E when arranged as specified, and used in combination with the support G, as set forth.

EDGAR M. BIRDSALL.

Witnesses:
WM. COMSTOCK,
CHARLES KETCHUM.